US005967013A

United States Patent [19]

McKenzie et al.

[11] Patent Number: 5,967,013

[45] Date of Patent: Oct. 19, 1999

[54] CORNER UNDERCUT JAMB SAW

[76] Inventors: Ray W. McKenzie, 149 N. 400 W., Greenfield, Ind. 46140; Andrew N. Hegdahl, 6212 W. 500 North, McCordsville, Ind. 46055

[21] Appl. No.: 08/915,879

[22] Filed: Aug. 21, 1997

[51] Int. Cl.[6] .......... B23D 19/00

[52] U.S. Cl. .......... 83/483; 83/485; 83/489; 83/743; 30/290; 30/371; 30/388; 30/391

[58] Field of Search .......... 83/483, 485, 489, 83/743, 745, 829, 588; 30/290, 296.1, 371, 288, 373, 390, 391

[56] References Cited

U.S. PATENT DOCUMENTS

| | | | |
|---|---|---|---|
| 2,610,658 | 9/1952 | Koeling . | |
| 3,111,969 | 11/1963 | Bivens . | |
| 4,510,835 | 4/1985 | Cromeens | 83/471.2 |
| 4,858,662 | 8/1989 | Bosten et al. | 144/136 C |
| 4,876,793 | 10/1989 | Quagli | 83/122 |
| 5,257,654 | 11/1993 | Bean et al. | 144/136 |
| 5,657,804 | 8/1997 | Lee | 144/136.95 |
| 5,784,789 | 7/1998 | Vargas | 30/388 |

OTHER PUBLICATIONS

Brochure entitled "Janser Laminate Installation Tools", by Janser, 200 Paw Paw Avenue, Benton Harbor, MI 49022–3400.

Magazine entitled "Floor Covering Installer/Summer 1997", p. 44.

*Primary Examiner*—Lee W. Young
*Assistant Examiner*—Kevin G. Vereene
*Attorney, Agent, or Firm*—Woodard, Emhardt, Naughton Moriarty & McNett

[57] ABSTRACT

A powered circular saw blade on a vertical shaft is supported on a slide which is slideably mounted on a guideway having feet to enable moving the assembly around on a building sub-floor. The feet are adjustable to enable raising or lowering the guideway base and, thereby, the saw blade. A blade guard is affixed to the guideway base and shaped to admit the saw assembly to an inside corner of a building room. The blade is normally retracted behind the blade guard but can be advanced to position ahead of the guard as the guard is braced against a door jamb or the like and the slide is pushed toward the door jamb to advance the blade into cutting position. Immediately upon release of the advancing force manually applied, a return spring returns the blade to retracted protected position.

13 Claims, 3 Drawing Sheets

CORNER UNDERCUT JAMB SAW

BACKGROUND OF THE INVENTION

1. Field of the Invention

This invention relates generally to powered saws, and more particularly to a saw for removing enough wood from the lower end of door jambs to enable installation of flooring products such as ceramics, carpets, vinyl tile and hardwood, for example.

2. Description of the Prior Art

There is currently on the market, an undercut saw marketed by Crain Cutter Co., Inc. of Milpitas, Calif. under the Model No. 800. This saw is useful to cut away the lower end of outer corners of door jambs immediately above a sub-floor, to provide sufficient space to insert finish flooring materials. Another saw which we have heard a little about is a "door trimmer" by Janser Inc. of Benton Harbor, Mich. But we do not believe that these saws are useful for interior corners. Prior to the present invention, it was necessary to use a hand saw or chisel at inside corners or use shoe molding to cover up the finished flooring at inside corners. So there has been a need for a better way to undercut door jambs. This invention addresses that need.

SUMMARY OF THE INVENTION

Described briefly, according to a typical embodiment of the present invention, a powered cutter is supported on a carriage which is mounted on a guideway supported to enable moving the machine around on a horizontal surface such as a sub-floor of a building. The cutter-to-floor spacing is adjustable. A cutter guard is affixed to the guideway and shaped to admit the machine to an inside corner of a building room. The cutter is normally disposed in a retracted rest position behind the guard but can be advanced into position ahead of the guard when the guard is positioned adjacent or against a door jamb or the like and the carriage is pushed toward the door jamb to advance the cutter into cutting position. Immediately upon release of the advancing force, the cutter is resiliently returned to retracted protected position.

DESCRIPTION OF THE PREFERRED EMBODIMENT

Figure 1:
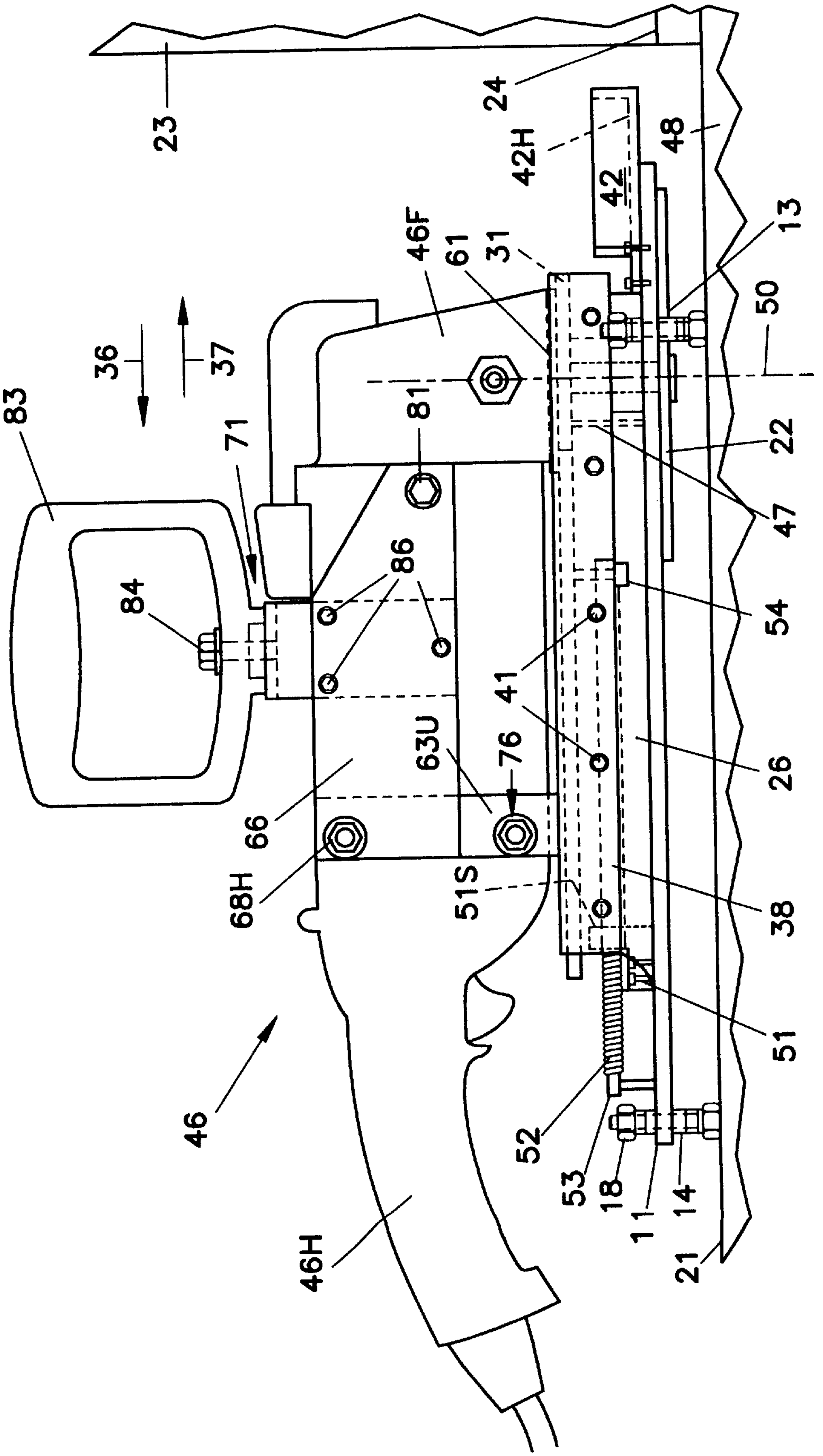
FIG. 1 is a side elevational view of the corner undercut jamb saw according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, a guideway base plate 11 is generally rectangular in configuration but with a pointed front portion having a forwardly-opening U-shaped notch 11L, 11R centered on the longitudinal center line of the base. The base is supported at three points 12, 13 and 14 by adjusting foot assemblies, each of which, in the illustrated embodiment, includes a ¼-20 bolt 16, an assortment of washers 17 and a stop nut 18 threaded on the top of the bolt. The selection and thickness of the washers and their location between the bolt head 19 and the bottom 11B of the base 11 determines the spacing between the base and the sub-floor or other support surface 21. It thereby determines the spacing between the saw blade 22 and the surface 21. Therefore, if surface 21 is the sub-floor of a room, the spacing established by the adjustable feet determines the space between the sub-floor and the bottom of a door jamb 23 after it is cut at line 24 by the saw blade. Alternatively to the washer stack, threaded holes can be provided in the plate 11 and jamb nuts screwed onto the bolt above and below the plate and tightened against the plate after the desired adjustment is made by threading the bolt 16 up or down in the plate. Other alternatives may be employed. The use of the three feet assures that there will be no rocking of the machine as the cut is made, even if the floor 21 is not perfectly level and smooth.

Base plate 11 has two parallel upstanding guide flanges 26 and 27, the top edges of which lie in a plane that is parallel to the plane of the bottom 11B of the plate 11. These flanges serve both as guideways and supports for a carriage which is in the form of slide 31 which is rectangular and includes two parallel downturned flanges 32 and 33 located immediately inboard and in slip-fit relationship to the flanges 26 and 27, respectively. Slide runners are provided in the form of narrow, downwardly facing surfaces 34 and 35 of the slide immediately outboard the guide flanges 32 and 33, respectively, and bearing on the top edges 26T and 27T of the guide flanges 26 and 27, respectively. Therefore, the slide 31 can readily slide back and forth in the directions of arrows 36 and 37, respectively, in FIG. 1. The slide is retained on the base flanges 26 and 27 by brackets 38 and 39, respectively, which have an inverted L-shape, the downwardly extending legs thereof being fastened to the flanges 26 and 27 by five screws 41, each.

A nose guard or blade guard 42 is made of a piece of metal that has an upstanding flange serving as a wall which makes an angle of 90° as viewed from the top. The base 42H of the guard extends rearwardly from the wall and has a U-shaped notch 42S opening to the rear and aligned with the forwardly opening U-shaped notch 11L, 11R between the edges 11L and 11R (FIG. 2) in the base 11. The guard base is fastened to the top of base 11 at opposite sides of the notches by screws such as 44, and is mounted so that the bisector of the corner angle and the notches is at the center line 43 of the machine. This enables the machine to be moved into an inside corner of building room walls as represented by the two corner jamb pieces 23A and 23B. It should be recognized, of course, that the angle can be even sharper, if desired, to facilitate undercutting jamb boards that are disposed at an angle less than 90°. But the travel of the saw blade 22, as will be seen, is so significant that it is capable of undercutting jambs all the way through the jambs even though the included angle between the two jamb boards is less than 90°.

Power for the saw is provided by a power unit 46 including an electric motor, handle and gear head assembly which, in the illustrated example, is a MILWAUKEE BRAND electric polishing machine, Model No. 5540, manufactured by the Milwaukee Electric Tool Corporation of Brookfield, Wis., 53005 U.S.A. Because that machine is not marketed for usage as a saw, we provide a special arbor 47 which has a threaded central aperture whereby the arbor is screwed onto the polisher output spindle and up tight against a shoulder thereon. The saw blade 22 is mounted on the arbor, and secured thereon by a tapered flat head screw 48 with an allen socket in the head and ⅝-10 thread screwed into the threaded central aperture in the arbor. The taper centers the blade on the spindle axis. The blade is non-rotatably pinned to the arbor by two number 10-32 set screws parallel to and on opposite sides of the spindle axis 50. The saw blade is a standard 5.5 inch diameter carbide-tipped blade drilled to receive the setscrews. The blade is spaced slightly below the bottom 11B of the base 11.

Figure 2:
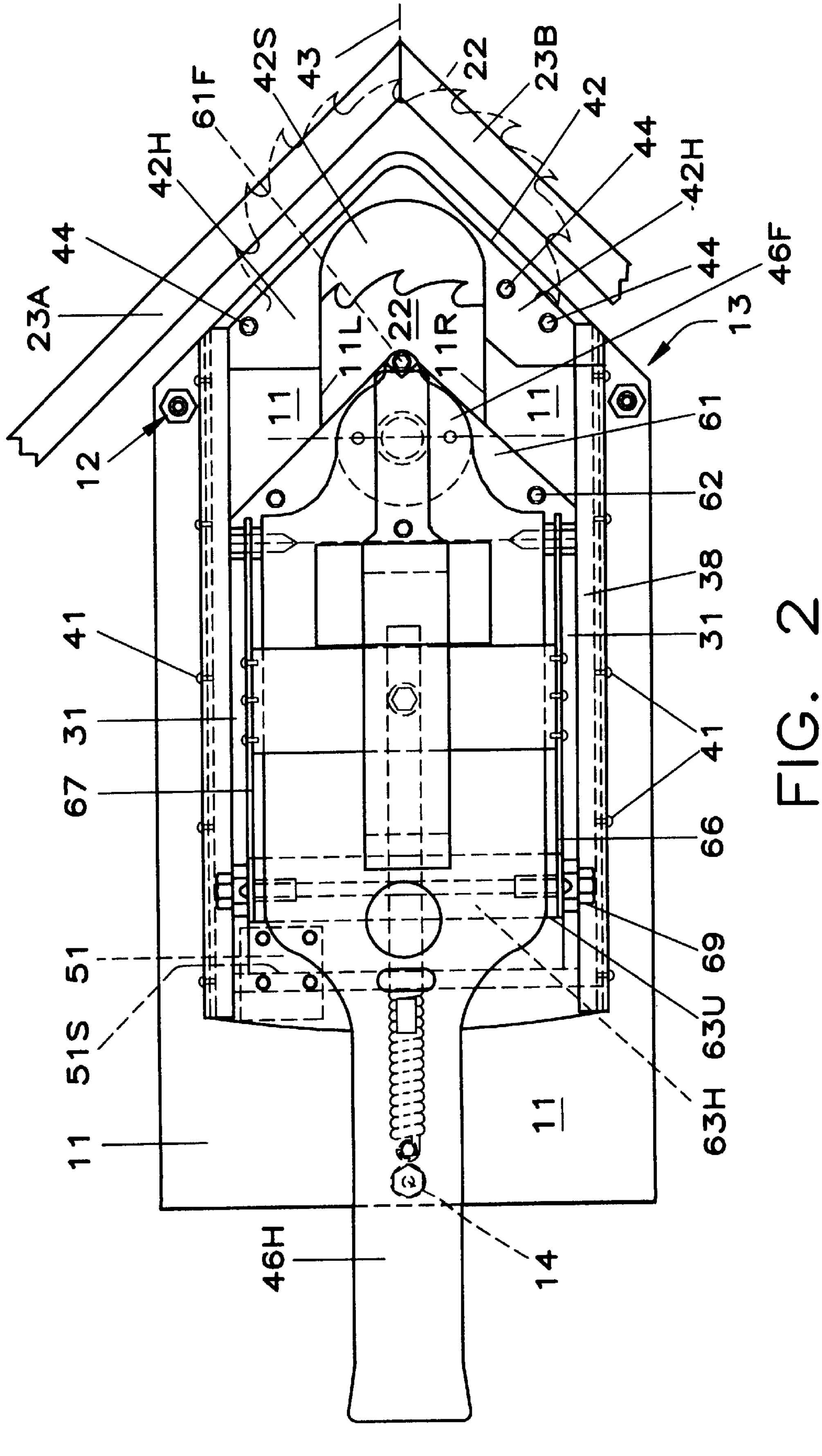
FIG. 2 is a top plan view thereof.

The spindle and arbor of the polisher require clearance as the saw blade is advanced from the position shown by the solid line 22 in FIGS. 1 and 2, to the dotted line position shown in FIG. 2 where it is fully advanced. Therefore, the base is provided with notch 11L, 11R beginning in base 11 behind the spindle and extending forward and open at the front. Similarly, the base 42H of the blade guard has the rearwardly-opening notch 42S beginning near the front of the guard and extending to the rear and in registry with the base notch 11S, and through which the blade 22 can be seen in FIG. 2. This combination of notches provides an open path for the blade mounting arbor as it is moved forward from the rest position shown by the solid circular representation of the saw blade to the position shown by the dashed circular representation of the saw blade.

A generally L-shaped back stop 51 fastened to base 11 near the rear end of the base and engageable by the rear end of the slide flange 33, limits the rearward travel of the carriage relative to the base 11. The power unit is constantly urged toward a rest position against the back stop by a return device. For illustration, not limited, an example is tension spring 52 whose rear end is hooked to a post 53 screwed into the plate 11 below the machine handle 46H. The front end of the spring is hooked at 54 in a hole in slide 31 or to a post projecting down from the bottom of slide 31.

Figure 3:
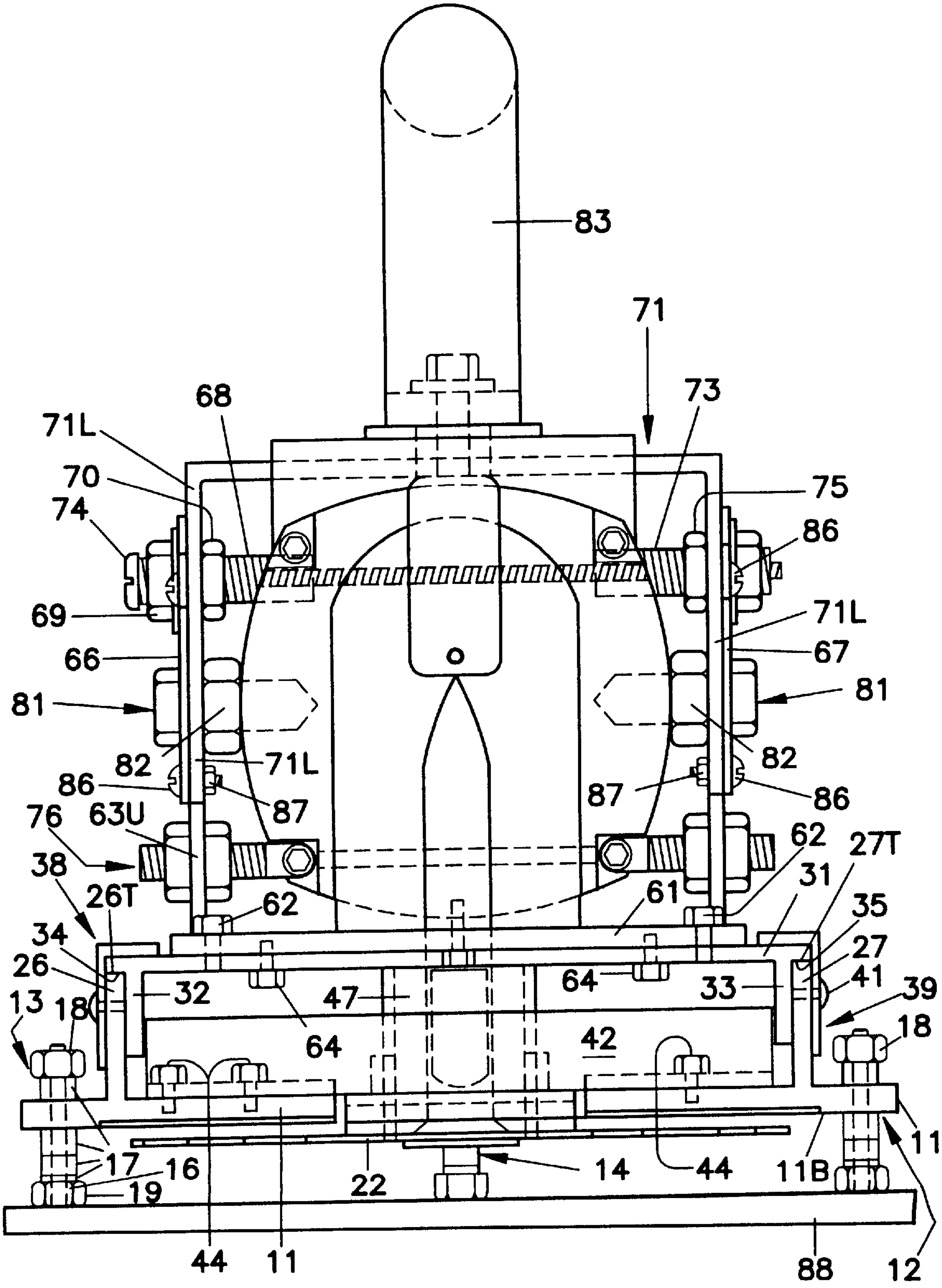
FIG. 3 is a front end view thereof.

The power unit is mounted to the slide 31 at the front and rear. At the front, a triangular plate 61 fastened to the top of the slide 31 by two cap screws 62, is fastened to the bottom of the motor gear case 46F at the front 61F by a screw extending up into the gear case from the bottom of the plate 61. Near the rear end of the motor, there is a U-shaped bracket 63 which is fastened to the top of the slide 31 by screws 64 (FIG. 3) extending up through the slide and threaded into the horizontal portion 63H of the bracket 63. Upstanding arms 63U of the bracket 63 are connected both to the motor housing at the rear and to side bracket plates 66 and 67. The connection of the bracket 63 to the side plates 66 and 67, is made by two special studs, one on each side and which pass through the plates 66 and 67 and the upstanding arms 63U at each side of the motor housing. The attachment includes the stud 68 having the nut 69 outside plate 66 and nut 70 inside the upstanding bracket arm 63U which is hidden behind the downwardly extending leg 71L of the handle mounting bracket in FIG. 3. The threaded body of the stud passes freely through apertures in the side mounting plate 66 and the upstanding bracket arm 63U and into a recess in the side of the motor housing where the original housing tie bolt head normally resided. The same construction is provided with stud 73 at the opposite side of the motor housing. Both studs 68 and 73 are internally threaded with a number 10-32 thread. A through bolt or screw 74 threaded throughout its length, extends all the way through stud 68 and the motor housing and stud 73. Its threaded reception in the studs, and the abutment of the inner ends of the studs in the recesses in the motor housing, enable tightening the studs against the motor housing to hold it together just as it was originally held together by the through bolt that was removed to enable adaptation to the present invention. The outer ends of the studs can be slotted, if desired, to facilitate turning them in on the screw 74 and thereby tightening the studs against the motor housing. The nut 69 threaded onto stud 68 is tightened against the side plate 66, and the nut 70 threaded onto the stud 68 is tightened against the inside face of the arm 63U of mounting bracket 63 affixing the bracket 63 and the side plate 66 together. The same construction is provided at the other arm of bracket 63 and side plate 67. The same kind of construction is provided near the bottom of each of the arms 63U with the studs, through bolt or screw, nut and washer assembly 76.

At the front of the side bracket plates 66 and 67, they are connected to the motor body by bolts 81 (FIG. 3) threaded into the gear case, with suitable spacer nuts 82 between the inside faces of the plates 66 and 67, and the outside faces of the gear case. The threaded holes in the gear case are those already provided for mounting a handle on the left hand or right hand side of the machine when it was used as a polisher.

A handle 83 is fastened by bolt 84 to the horizontal portion of the handle mounting bracket 71, the downwardly projecting legs 71L of which are fastened to the inside faces of plates 66 and 67 by three number 10-32, round head screws 86 with washers and nuts 87 on the inside face of the side plates 66 and 67.

In the use of the invention, a determination is first made as to whether or not the sub-floor on which the machine is to be operated, is hard and smooth enough for the bolt heads 19 of the adjustable foot assemblies to be slided on it smoothly. If not, or if the jambs are being undercut prior to placement of underlayment, a piece of plywood or underlayment material 88 can be placed under the feet for the machine feet to rest on it in the same position as the piece 88 is maneuvered around on the sub-floor to place the machine in the orientation desired for undercutting jambs. In any case, the feet are adjusted by the appropriate selection of washers to place the top of the saw blade at the desired level above the sub-floor to accommodate the insertion of finished flooring tile, wood, carpet or other material. Then the machine is pointed toward the surface to be undercut and moved to position the blade guard 42 at or near the vertical surface of the door jamb or wall molding. Then the saw blade is started by pulling the trigger under handle 46H and the blade is advanced by pushing the power unit forward toward the wall, advancing the blade into the door jamb or wall molding and moving the machine around the door jamb as needed to provide the desired undercut. Then, when the cutting is complete within the range of motion of the blade, the handle is released and the power unit returns under the urging of the spring 52 until the rear end of the slide flange 33 engages the upwardly extending abutment surface 51S of the back stop 51. The total travel of the slide 31 on the base 11 from the forwardmost position of the blade shown by the dotted outline 22 in FIG. 2 and where the angled front end of the bracket 61 (FIG. 2) is immediately behind the upturned wall of the blade guard 42, to the normal rest position where the rear end of guide flange 33 abuts the stop 51S, is approximately 2⅝ inches.

From the foregoing description, it can be readily recognized that practice of the invention can be made with different brands of power units, electrically or otherwise powered, with circular or other cutters, and the mountings thereof to the carriage will be different, depending upon the specific construction of the power unit. Cutter height adjustment can be done otherwise than with the illustrated screws, nuts and spacers. Also, of course, apparatus tailor-made throughout to function according to the present invention, can be provided. Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A building corner trim undercutting machine comprising:

a base having a front end and a rear end;

a carriage linearly moveable relative to the base in the direction of a horizontal line of motion extending from the front end to the rear end, the carriage being movable in the direction of the line to advance from a rest position to an active position;

a motor fastened to the carriage;

a rotary cutter coupled to the motor to be driven by the motor;

a return device coupled to the base and to the carriage and accommodating movement of the carriage forward on the base toward said active position while urging the carriage against forward movement and toward the rest position; and the base having side walls with portions converging toward the front end at angles enabling advance of the cutter into an inside corner of building walls and advance of the cutter through the corner while the base remains stationary in position facing the corner-defining building wall surfaces.

2. The machine of claim 1 and further comprising:

support feet with height adjusters connected to the base.

3. The improvement of claim 1 and wherein:

the cutter is under the base and the cutter includes a disk with cutting edges thereon; and the base covers an area large enough to cover the cutting edges when the carriage is retracted to the rest position.

4. The improvement of claim 1 and wherein:

the cutter is a saw blade; and the base includes a pointed front end portion enabling advance of the blade into an inside corner of building walls and enabling the advance of the blade through the corner while the base remains stationary in position facing said corner-defining building-wall surfaces.

5. The improvement of claim 1 and wherein:

the base includes a front end with a wall abuttingly engageable with said corner-defining wall surfaces of an inside corner, the wall of the base front end defining an angle less than 100°.

6. The improvement of claim 3 and wherein:

the cutter is a circular saw blade rotatable on a vertical axis;

the carriage is mounted to the base for said linear mobility; and the base has a front portion whose horizontal width, at a transverse plane perpendicular to said line of motion and containing the vertical axis when the carriage is at its maximum advance relative to the base along the line of motion, and measured perpendicular to the axis, is less than two-thirds the diameter of the saw blade.

7. The improvement of claim 3 and wherein:

the base includes a guard having an outside corner surface at the front end of the base, said line of motion intersecting the corner, and the guard surface forming an angle less that 100° at the corner, with the line of motion bisecting the angle.

8. The improvement of claim 7 and wherein:

the corner surface defines an included angle of about 90 degrees.

9. The improvement of claim 7 and wherein:

the base includes a plate having a front end and a rear end and upstanding flanges, and an angle piece fastened to the plate near the front end of the plate and serving as the guard; and the carriage includes a plate having a front end and a rear end and downwardly projecting flanges guidingly associated with the flanges of the base to guide the carriage along the line of motion as the carriage is moved relative to the base.

10. The improvement of claim 1 and further comprising:

a motor housing having a front end and a rear end and enclosing the motor;

a gear case fastened to the front end of the housing;

a handle fastened to the rear end of the housing; and a first bracket attached to the carriage and having upstanding arms fastened to the motor housing at the rear end of the housing to support the rear end of the motor housing on the carriage, the gear case being fastened to the carriage to support the front end of the motor housing on the carriage.

11. The improvement of claim 10 and further comprising:

a pair of side brackets attached to the motor housing at the upstanding arms and attached to the gear case;

a handle mounting bracket having a horizontal portion and downturned legs at each side of the horizontal portion, the legs being fastened to the side brackets; and a second handle fastened atop the horizontal portion.

12. The improvement of claim 11 and wherein:

the base includes two parallel, horizontally-spaced flanges; and the carriage includes two parallel, horizontally-spaced flanges;

at least two of the flanges supporting the carriage on the base whereby the carriage is slideably and guidingly mounted on the base.

13. The improvement of claim 3 and wherein:

the base includes a pointed front end portion enabling advance of said cutter into an inside corner and enabling the advance of the cutter through the corner while the base remains a position facing corner-defining wall surfaces.

* * * * *

UNITED STATES PATENT AND TRADEMARK OFFICE
CERTIFICATE OF CORRECTION

PATENT NO : 5,967,013

DATED : October 19, 1999

INVENTOR(S) : Ray W. McKenzie and Andrew N. Hegdahl

It is certified that error appears in the above-identified patent and that said Letters Patent are hereby corrected as shown below:

In column 3, line 20, please change "11S," to --11L, 11R,--.

Signed and Sealed this

Twenty-second Day of May, 2001

Attest:

Nicholas P. Godici

NICHOLAS P. GODICI

*Attesting Officer* — *Acting Director of the United States Patent and Trademark Office*